(12) United States Patent
Younggren et al.

(10) Patent No.: US 6,569,043 B2
(45) Date of Patent: May 27, 2003

(54) CLUTCH WITH A ONE-WAY TORQUE CARRYING BEARING

(75) Inventors: Bruce H. Younggren, Bemidji, MN (US); Michael Gunderson, Bemidji, MN (US); Shane Okeson, Mahnomen, MN (US); Brian G. Eck, Bemidji, MN (US)

(73) Assignee: Team Industries, Inc., Bagley, MN (US)

( * ) Notice: Subject to any disclaimer, the term of this patent is extended or adjusted under 35 U.S.C. 154(b) by 116 days.

(21) Appl. No.: 09/757,799

(22) Filed: Jan. 9, 2001

(65) Prior Publication Data

US 2002/0065156 A1 May 30, 2002

Related U.S. Application Data

(63) Continuation-in-part of application No. 09/723,963, filed on Nov. 28, 2000.
(60) Provisional application No. 60/167,765, filed on Nov. 29, 1999.

(51) Int. Cl.$^7$ ............................................... F16H 59/00
(52) U.S. Cl. ....................................................... 474/19
(58) Field of Search ............................. 474/17, 18, 19, 474/20, 21, 37, 46

(56) References Cited

U.S. PATENT DOCUMENTS

| | | | | |
|---|---|---|---|---|
| 3,195,364 A | | 7/1965 | Pauli | 74/230.17 |
| 3,916,707 A | | 11/1975 | Wells | 74/230.17 |
| 3,939,720 A | | 2/1976 | Aaen et al. | 74/230.17 |
| 3,996,811 A | | 12/1976 | Reese | 74/230.17 |
| 4,523,917 A | | 6/1985 | Schildt | 474/19 |
| 4,585,429 A | | 4/1986 | Marier | 474/12 |
| 5,326,330 A | | 7/1994 | Bostelmann | 474/13 |
| 5,341,698 A | * | 8/1994 | Tseng | 192/35 |
| 5,421,784 A | | 6/1995 | Robert | 474/13 |
| 5,460,575 A | | 10/1995 | Berto | 474/11 |
| 5,516,333 A | | 5/1996 | Benson | 474/19 |
| 5,562,555 A | | 10/1996 | Peterson | 474/14 |
| 5,720,681 A | | 2/1998 | Benson | 474/10 |
| 5,967,286 A | * | 10/1999 | Hokanson et al. | 192/110 R |
| 6,146,295 A | | 11/2000 | Mor et al. | 474/13 |

* cited by examiner

Primary Examiner—Thomas R. Hannon
Assistant Examiner—Vicky A. Johnson
(74) Attorney, Agent, or Firm—IPLM Group, P.A.

(57) ABSTRACT

A one-way bearing or clutch is provided to decouple a continuously variable transmission from the final drive member during reverse torque conditions.

3 Claims, 15 Drawing Sheets

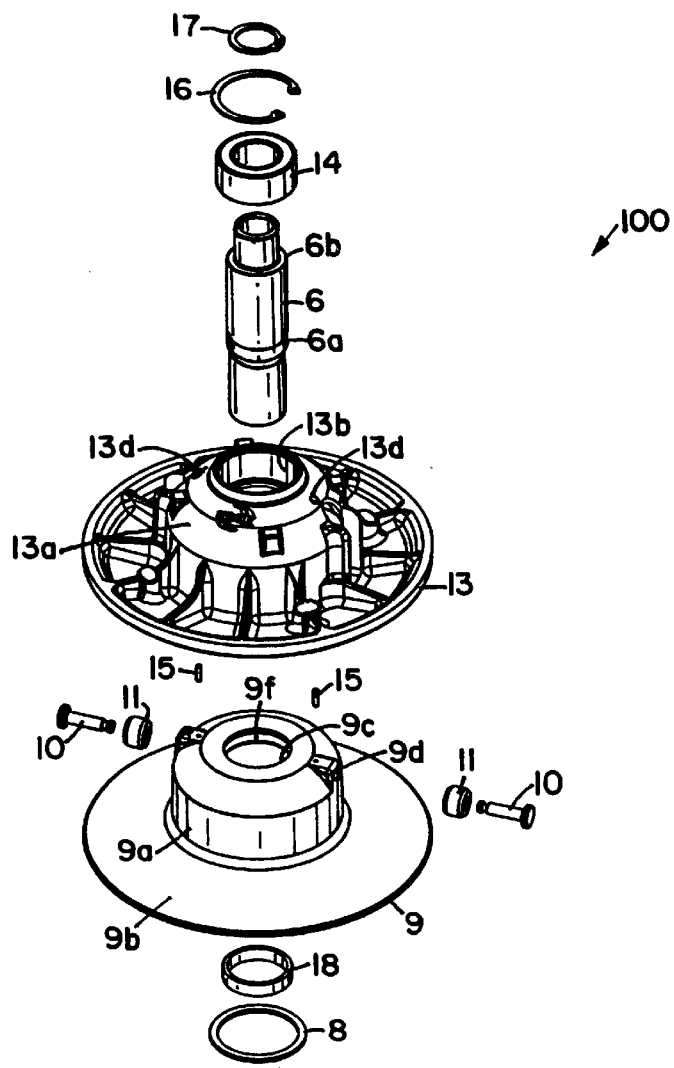
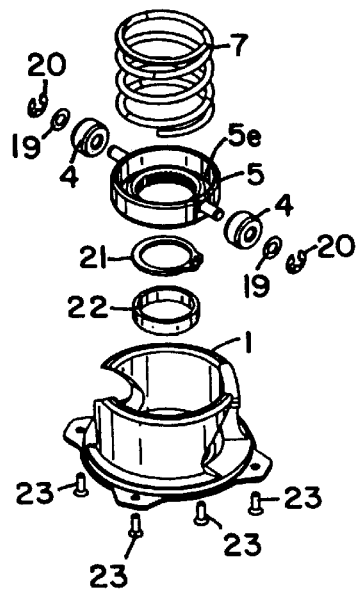
FIG. 1

CLUTCH WITH A ONE-WAY TORQUE CARRYING BEARING

This application is a continuation-in-part of U.S. Ser. No. 09/723,963 filed Nov. 28, 2000, entitled "Clutch With No Relative Motion" which claims benefit of Prov. No. 60/167,765 filed Nov. 29, 1999.

BACKGROUND OF THE INVENTION

1. Field of the Invention

The invention relates generally to a secondary clutch and more particularly to a disconnect, or one-way bearing between the Continuously Variable Transmission (CVT) and the final rotating member to give torque release in reverse torque conditions.

2. Description of the Prior Art

U.S. Pat. No. 5,720,681 issued Feb. 24, 1998, to Benson for a Torque Responsive Actuation Device. Benson discloses a three-surfaces cam similar to the disclosure of Laughlin, Deschene, and Butterfield et al (U.S. Pat. Nos. 3,605,510, 3,605,511 and 4,216,678, respectively). Benson applies crowned, or laterally radiused, rollers similar to those shown by Steuer (U.S. Pat. No. 3,722,308) to improve driven sheave performance. Sheave faces are biased toward the initial, or minimum separation position by a torsion spring.

U.S. Pat. No. 4,969,856 issued Nov. 13, 1990, to Miyata et al for a Pulley-Type Speed-Shifting Device. Miyata et al discloses a pulley-type transmission that can be manually set at any desired ratio. The structure of the cam follows is similar to that of the disclosed driven sheave cam follower in that a spider with two rollers is used to set the separation of the sheave halves. Engine braking is provided with this transmission system by a tensioner that prevents belt disengagement during operation.

U.S. Pat. No. 4,523,917 issued Jun. 18, 1985, to Schildt for a Variable Pitch Diameter Torque Sensing Pulley Assembly. Schildt discloses a cam-actuated torque-responsive pulley that has two steps in the cam angles. When the sheave faces are between their greatest separation and mid-range (i.e., the effective diameter is small), a low cam angle (e.g., 30°) causes a high axial force to be applied to the belt. When the sheave faces are between mid-range and their closest, the axial force applied against the belt is lower because the cam angle is steeper (e.g. 45°). The cams and cam followers are symmetrical making the pulley bi-directional. An example of the use of the pulley as a drive pulley is given in which the driven pulley is fixed-pitch. The ratio of that system is varied by changing the distance between the driving and the driven shafts.

U.S. Pat. No. 4,378,221 issued Mar. 29, 1983 to Huff et al for a Torque Cam Assembly for Variable Speed Drive and Follower Element therefor. Huff et al disclose a driven sheave that can operate rotating in either direction. Also described is a cam surface-contacting plastic wear button that has a quicker break-in time than some earlier buttons.

U.S. Pat. No. 3,722,308 issued Mar. 27, 1973 to Steuer et al for a Bearing of the Conical Discs of an Infinitely Variable Cone Pulley Transmission. Steuer discloses an improved shape for the rollers that transmit power from the moveable sheave element to the driven shaft. The attempt is to overcome wear of the rollers and inclined ramps on which the sheave spacing adjustment rollers operate. It may be that the design of the disclosed driven sheave element reduces the need for the remedy disclosed by Steuer.

U.S. Pat. No. 3,605,511 issued Sep. 20, 1971 to Deschene for a Self-Cleaning Centrifugal Clutch. Deschene discloses a radially grooved shaft between the two faces of the CVT drive split sheave disclosed by Laughlin. The grooves are said to reduce belt wear when the engine is idling and the vehicle is stopped. In addition, any build-up on the shaft is cleared by operation of the drive sheave.

U.S. Pat. No. 3,365,967 issued Jan. 30, 1968 to Moogk for a Stepless Variable V-Belt Driving Gear With Asymmetric V-Belt. Moogk discloses a pair of rollers that contact cams to maintain constant speed in response to varying torque. A compression spring provides a biasing force against which the rollers and cams act.

U.S. Pat. No. 2,900,834 issued Aug. 25, 1959, to Bessette for an Automatic Variable Speed Pulley. Bessette discloses a V-belt pulley that automatically adjusts the effective diameter of the pulley in accordance with the load applied to it. A moveable split sheave face is moved toward a fixed sheave face by cams acting against radially extending pins. A torsion spring biases the sheave faces toward the initial or starting condition. Rollers in complementary inclined tracks or grooves can be used in place of the pins and cams.

U.S. Pat. No. 2,623,400 issued Dec. 30, 1952, to Davis for a Power Transmission and Centrifugal Clutch. Davis discloses a centrifugal clutch that moves split drive sheave faces toward each other to engage a V-belt. A spring-loaded driven split sheave serves as a belt-tightener.

U.S. Pat. No. 2,276,186 issued Mar. 10, 1942, to Getchell for a Pulley Construction. Getchell discloses a split-sheaved pulley that is much more complex than the design disclosed herein. Both halves of the sheave are moveable on the shaft and all power is transmitted through a spider keyed to the end of a shaft.

Current clutches have a spider or similar part, which ties the post to the moveable sheave. This spider is usually keyed or splined to the shaft on the inside diameter and has a roller or puck contacting the cam on the outside diameter. The cam in turn is typically connected to the moveable sheave. This design works very well for delivering torque from the engine through the primary clutch and belt to the secondary clutch and in turn directing power to the ground.

This system, however, becomes inefficient when there is a reversal in torque and back shifting. This torque reversal occurs when the operator releases the throttle at which point the engine RPM drops, and because of inertia, the rear tires or track continue at a greater ratio of speed compared to the engine. Back shifting refers to the amount of time that it takes the engine to regain the optimum RPM, for example 8000, once the operator goes back to wide open throttle. With current designs a very heavy spring in the secondary clutch is necessary in order to get optimum back shift into the correct ratio. (A lighter spring would give the clutch better up shifting, thus increasing torque sensitivity.) In current designs the tuner has to balance up shifting and back shifting performance.

When the operator releases the throttle, the engine RPM lowers, the belt clamping force in the primary clutch drops and the engine drops to a lower power level. If the secondary clutch can't follow the primary and shift into a lower ratio fast enough, it will take the engine longer to run at an ideal RPM, usually around 8000 in the case of snowmobiles. Note that if the secondary clutch is in the correct ratio or the ratio is too low, the engine will reach optimal RPM more quickly than it would if the secondary clutch is in too high a ratio.

With the current designs to get optimum back shifting a very stiff spring is necessary with the result that the belt life is shortened, fuel mileage is diminished, top end speed is lowered, torque sensitivity in the cam is lowered and overall efficiency drops. If a soft spring is incorporated these problems are relieved but the CVT will not then back shift as fast as it would with the stiff spring.

In most secondary clutches of current design, the stationary sheave is typically fixed to the post. The moveable sheave rotates about and moves longitudinally on the post. As the CVT system changes ratio, the moveable sheave rotates relative to and moves toward or away from the stationary sheave. The sheaves typically have over 500 lbs of belt squeezing force during acceleration and over 100 lbs in no-torque situations. Because of this force and the rotational movement between the two sheaves there is a significant amount of friction for the secondary clutch to change ratio. This is referred to as belt smear. A heavy spring is necessary to overcome the belt smear and force the clutch to shift into a lower ratio.

In the design of the clutch with no relative motion, as shown in FIGS. 1–9 of the present application, it is not necessary to overcome the belt smear because it has been eliminated in the design. However, a heavy spring is possibly still needed to get the secondary clutch to follow the primary clutch into a lower ratio because of the reverse torque coming through the system.

The present invention addresses the problems associated with the prior art and provides for a one-way torque carrying bearing to allow for a disconnect when reverse torque is delivered.

SUMMARY OF THE INVENTION

The current design using a one-way bearing alleviates the problems of decreased efficiency, fuel mileage, belt life, and top end speed while providing good back shifting. The one-way bearing is applicable in either a tied together or non-tied together secondary clutch portion of a rubber belt CVT. Belt smear in reverse torque applications is eliminated or minimized allowing for the use of a lighter spring which in turn improves upshifting (acceleration) and torque sensitivity. The one-way bearing in the clutch system allows the secondary clutch freedom to follow the primary clutch in reverse torque conditions.

When the rider lets off the throttle, the engine will slow down causing the speed sensing primary clutch to drop its belt squeezing force. In prior art systems with the secondary connected to the final rotating member of the drive train, the secondary may not follow the primary and drop into a lower ratio and, depending on the compression spring and how much back driving torque there is, may even shift into a higher ratio. When the operator returns to wide-open throttle, the engine bogs until the CVT, primarily the secondary clutch, shifts back to a lower correct ratio. This is caused by the physical inertia of the vehicle, which in turn causes slower deceleration of the vehicle in comparison to that of the engine. This imbalance in deceleration between vehicle and engine is called back driving. In the present invention, the one-way bearing will disengage the secondary clutch from this back driving, or reverse, torque. Because the secondary clutch is disconnected from this reverse torque, it can follow the primary clutch to a lower correct ratio for acceleration at wide-open throttle.

The one-way bearing housed in the spider is the primary torque carrying member for the moveable half of the secondary clutch in a non-tied together version. It would engage when the operator is trying to put torque through the CVT. Half of the torque would go through the stationary sheave to the post. The other half of the torque would follow through the moveable sheave, through the cam into the spider, into the one-way, into the spider collar, and into the post. When there is a negative torque, the one-way bearing would disengage allowing the post and spider/cam/sheave to rotate at different RPM. That is, the post RPM will be dictated by the track or tire and the moveable sheave RPM will be dictated by the primary clutch. This can be described in the use of a snowmobile when an operator locks up the brake for an instant and then immediately turns the throttle wide open. As soon as the brake is released, the track accelerates the jackshaft and secondary clutch, either keeping the secondary element in too high of a ratio or driving the secondary element into an even higher ratio. As soon as the operator goes back to wide open throttle, the engine bogs until the CVT shifts back to the correct ratio and then the engine operates at the optimum RPM. The one-way bearing would alleviate the problem of negative torque by allowing the secondary element to follow the primary down to a lower ratio resulting in improved throttle response and efficiency.

The one-way bearing housed in the spider is the primary torque carrying member for the secondary clutch in a tied together version. It would engage when the operator is trying to put torque through the CVT. Half of the torque would go through the stationary sheave through the connecting point and into the moveable sheave. The other half of the torque would follow through the moveable sheave, then all the torque would go through the cam into the spider, into the one-way, into the spider collar, and into the post. When there is a negative torque, the one-way bearing would disengage allowing the post and spider/cam/sheave to rotate at different RPM. That is, the post RPM will be dictated by the track or tire and the secondary clutch RPM will be dictated by the primary clutch. This can be described in the use of snowmobile when an operator locks up the brake for an instant and then immediately turns the throttle wide open. As soon as the brake is released, the track accelerates the jackshaft and secondary clutch, either keeping the secondary element in too high of a ratio or driving the secondary element into an even higher ratio. As soon as the operator goes back to wide open throttle, the engine bogs until the CVT shifts back to the correct ratio and then the engine operates at the optimum RPM. The one-way bearing would alleviate the problem of negative torque by allowing the secondary element to follow the primary down to a lower ratio resulting in improved throttle response and efficiency.

The one-way bearing can incorporate a lower rate compression spring without losing the performance of the heavy spring for good back shifting and at the same time gaining the increased efficiency, fuel mileage, belt life, and top end speed typically found with a lower rate compression spring. For a standard secondary clutch, springs will start at about 120–160 pounds in the lowest ratio and increase to 280–340 pounds in high ratio. With a one-way bearing in the system the spring forces can be lowered to around 50 pounds in low ratio and 100 pounds in high ratio.

In one embodiment, the invention is a continuously variable transmission driven element for mounting on a rotatable shaft and adapted for use in a belt-type continuously variable transmission operatively connected by an endless belt to a drive element. The driven element includes a post adapted and configured to be connected to a rotatable shaft. The post is fixedly extending from a hub. A conical-faced, belt contacting sheave fixed portion extends radially from the hub. A conical-faced, belt contacting moveable sheave portion is axially and rotatably moveable on the post. A cam, having a cam surface is operatively connected to the moveable sheave portion. A spider is operatively connected to the post. The spider has a sliding member which is positioned on the cam surface, wherein rotation of the cam on the spider moves the moveable sheave portion along the post. A torque carrying one-way bearing is operatively connected to the driven element, the one-way bearing is positioned between the shaft and the spider, wherein the one-way bearing is a torque carrying member delivering torque from the engine to the rotatable shaft and decouples the driven element from the rotatable shaft during delivery of reverse torque by the rotatable shaft.

In another embodiment, the invention is an assembly having a continuously variable transmission. A final rotating member of a drive train is operatively connected to the continuously variable transmission. A torque carrying one-way bearing is operatively connected between the continuously variable transmission and the final rotating member, wherein the one-way bearing couples the continuously variable transmission and the final rotating member during delivery of torque and decouples the continuously variable transmission and the final rotating member during delivery of reverse torque.

In another embodiment, the invention is a torque sensing clutch for mounting on a rotatable shaft. The clutch includes a cylindrical base member and a first sheave operatively connected to the cylindrical base member. The first sheave is rotatable on the cylindrical base member and is stationary relative to the longitudinal movement of a cylindrical base member. A second sheave is longitudinally moveable and rotatable on the cylindrical base member. A connector operatively connects the cylindrical base member to the second sheave for rotating the second sheave and for moving the second sheave longitudinally on the cylindrical base member. A one-way bearing is operatively connected to the torque-sensing clutch. The one-way bearing is positioned between the shaft and the connector, wherein the one-way bearing couples the clutch and rotatable shaft during delivery of torque and decouples the clutch from the rotatable shaft during delivery of reverse torque by the rotatable shaft.

In another embodiment, the invention is a torque-sensing clutch for mounting on a rotatable shaft. The clutch includes a cylindrical base member and a first sheave operatively connected to the cylindrical base member. The first sheave is rotatable on the cylindrical base member and is stationary relative to the longitudinal movement of a cylindrical base member. A second sheave is longitudinally moveable and rotatable on the cylindrical base. A first connector operatively connects the first sheave to the second sheave, wherein the second sheave rotates and moves longitudinally as the first connector rotates the first with the second sheave. A second connector operatively connects the cylindrical base member to the second sheave for rotating the second sheave and for moving the second sheave longitudinally on the cylindrical base member. A one-way bearing is operatively connected to the torque sensing clutch. The one-way bearing is positioned between the shaft and the second connector, wherein the one-way bearing couples the clutch and rotatable shaft during the delivery of torque and decouples the clutch from the rotatable shaft during the delivery of reverse torque by the rotatable shaft.

BRIEF DESCRIPTION OF THE DRAWINGS

FIG. 1 is an exploded perspective of a driven clutch incorporating the present invention;

DETAILED DESCRIPTION OF THE PREFERRED EMBODIMENT

Figure 6:
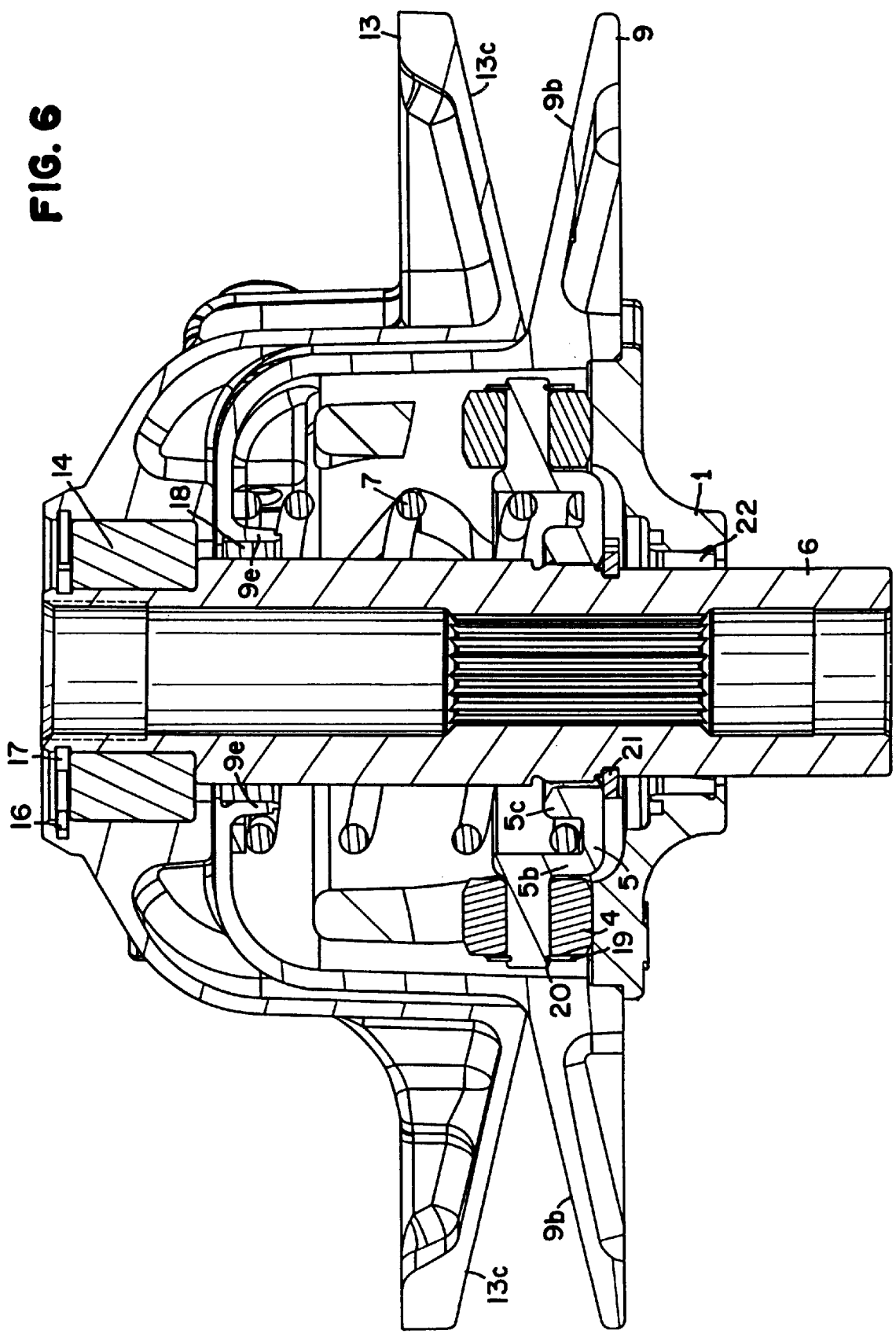
FIG. 6 is a cross-sectional view of the driven clutch shown in FIG. 4 taken generally along the lines 6—6.
Figure 7:
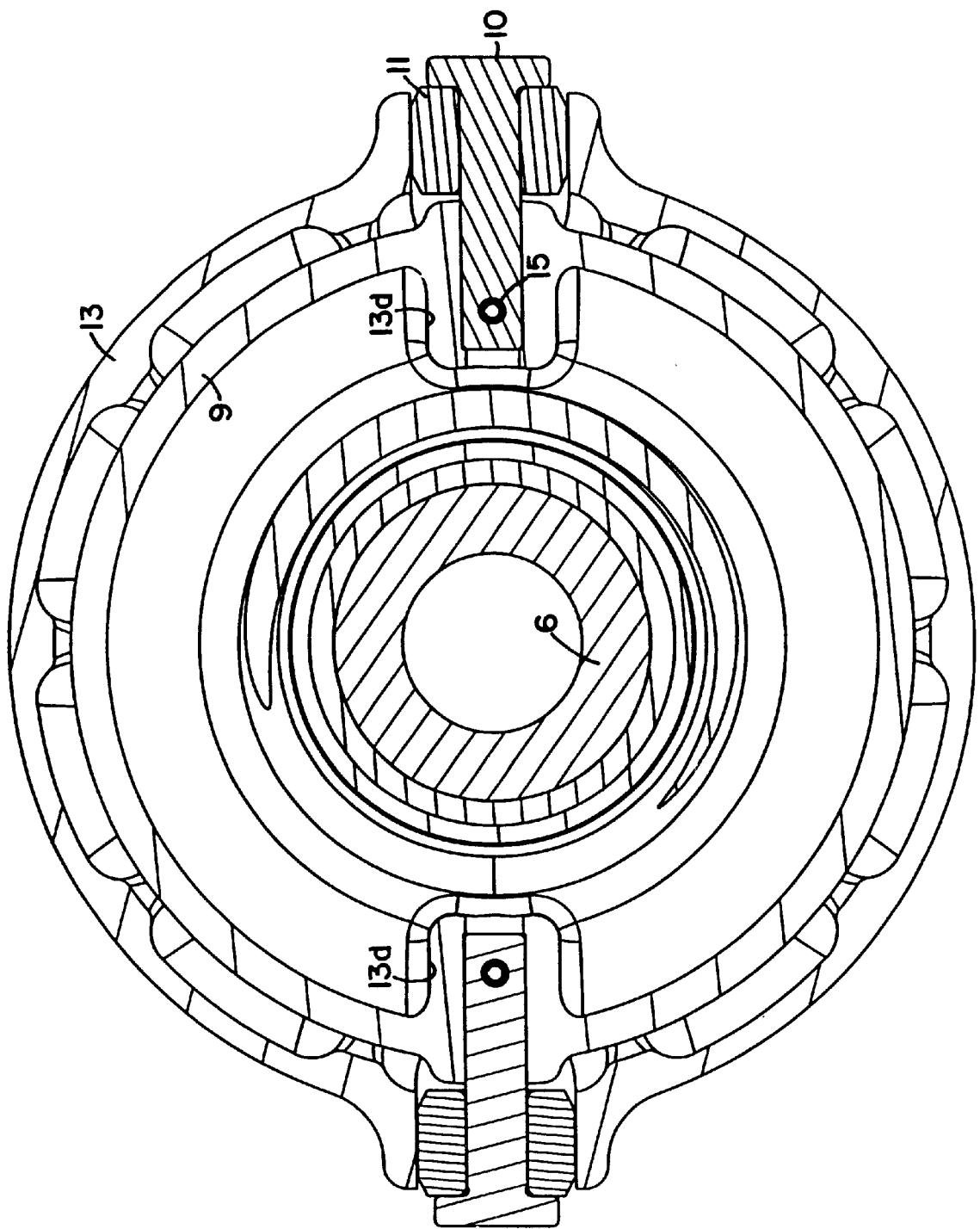
FIG. 7 is a cross-sectional view of the driven clutch in FIG. 5 taken generally along the lines 7—7.
Figure 8:
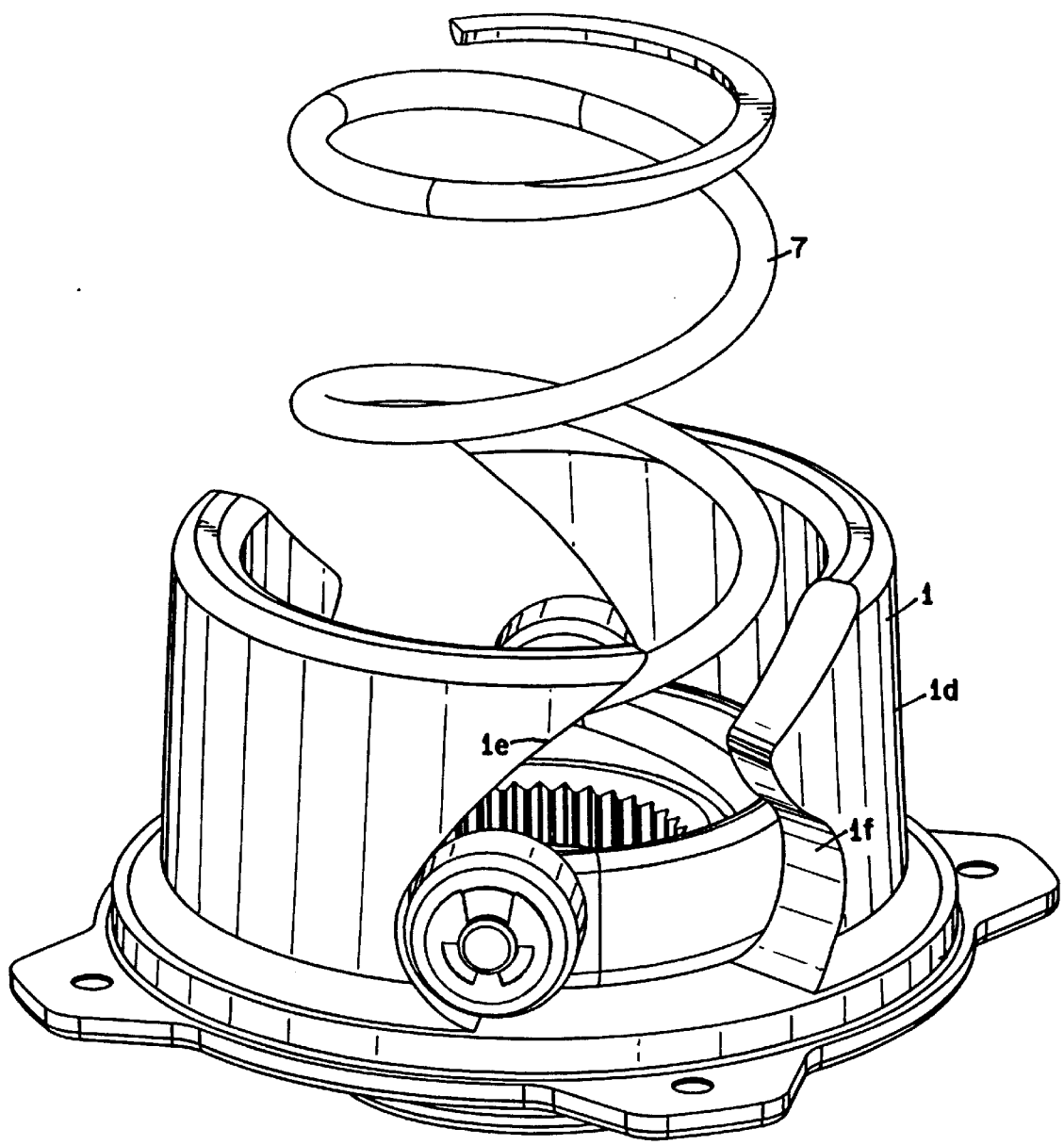
FIG. 8 is an enlarged perspective of the spider in the cam, shown in FIG. 1.

Referring to the drawing, wherein like numerals represent like parts throughout the several views, there is generally designated at 100 a driven clutch. A generally cylindrical post 6 has a plurality of vertical splines 6a formed on its outer surface. The splines 6a encircle the post 6. A shoulder 6b is formed at its top and the post 6 has a smaller diameter at its top end. As seen in FIG. 6, interior vertical splines 6c are formed over a portion of the longitudinal bore. This allows for a connection to a rotatable shaft, such as a transmission shaft. A first sheave 13 has a generally cylindrical housing 13a having an opening 13b formed therein. The sheave 13 also includes a first conical-faced belt contacting coaxially mounted sheave portion 13c which is preferably formed with the housing 13a to form a unitary, one-piece first sheave 13. The housing 13a has two vertical slots 13d formed therein. The slots 13d are spaced 180 degrees from each other. A bearing 14 is positioned in the opening 13b of the housing 13a and the first sheave 13 is coaxially mounted to the post 6 by snap rings 16 and 17. The bearing 14 could, of course, also be a bushing.

Figure 2:
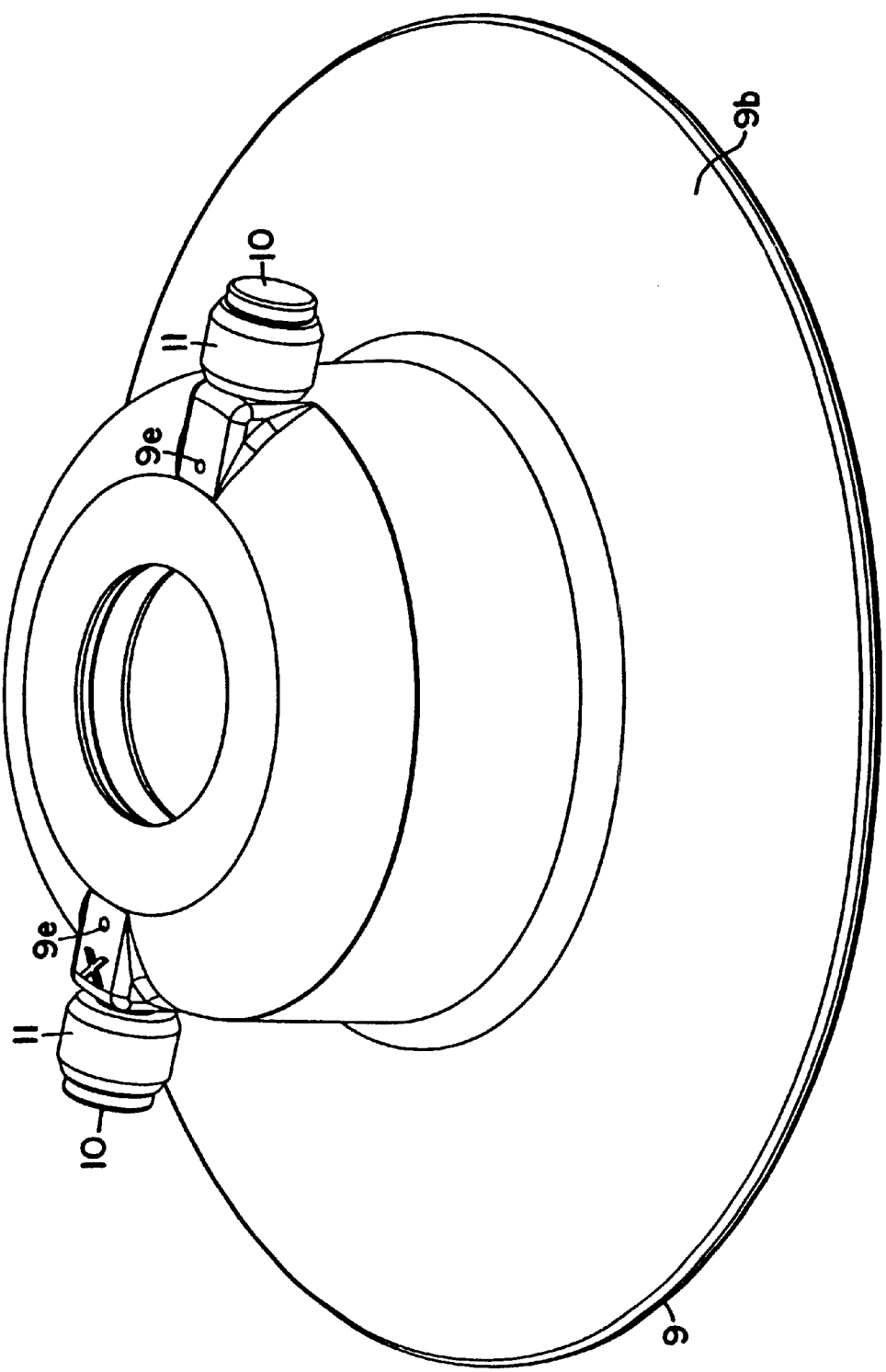
FIG. 2 is a top perspective view of the second sheave, shown in FIG. 1.
Figure 3:
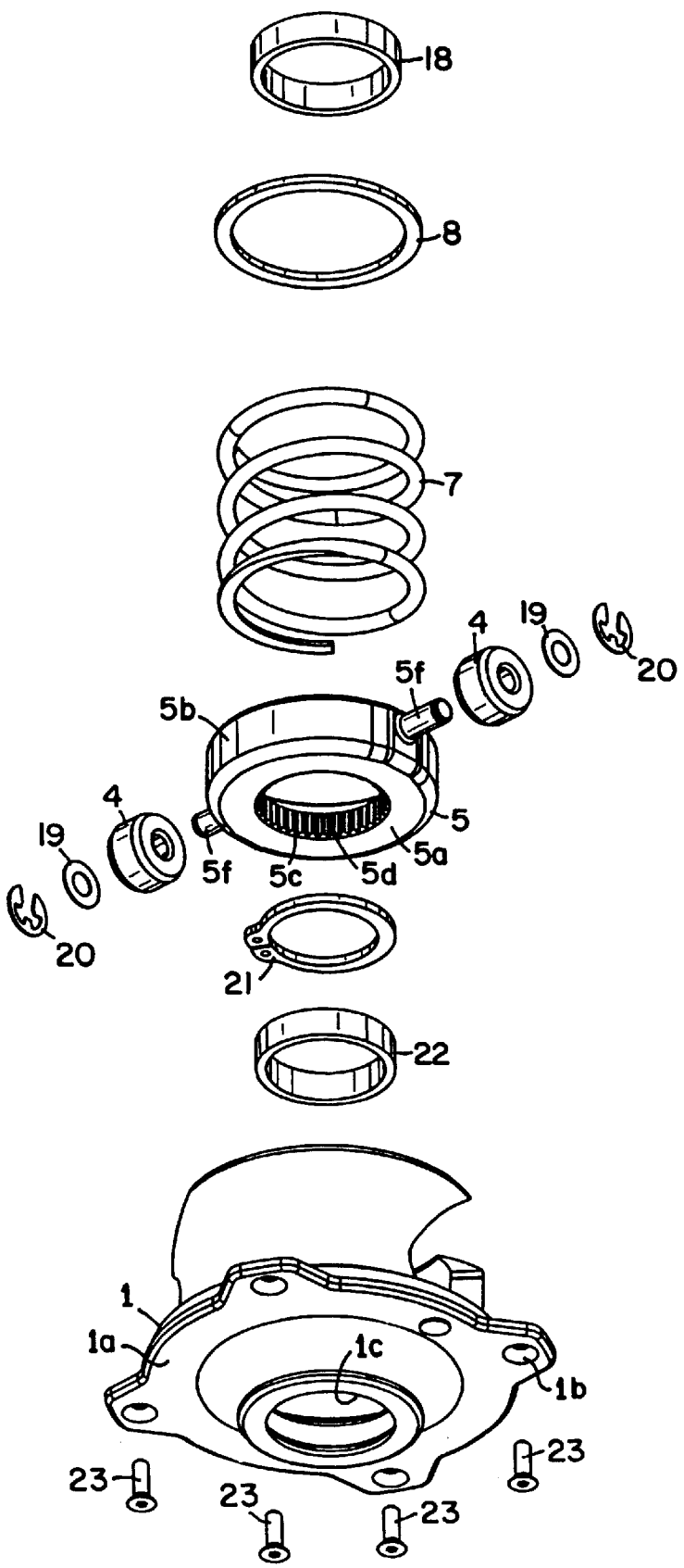
FIG. 3 is an enlarged exploded perspective of a portion of the invention shown in FIG. 1 as viewed from below.
Figure 4:
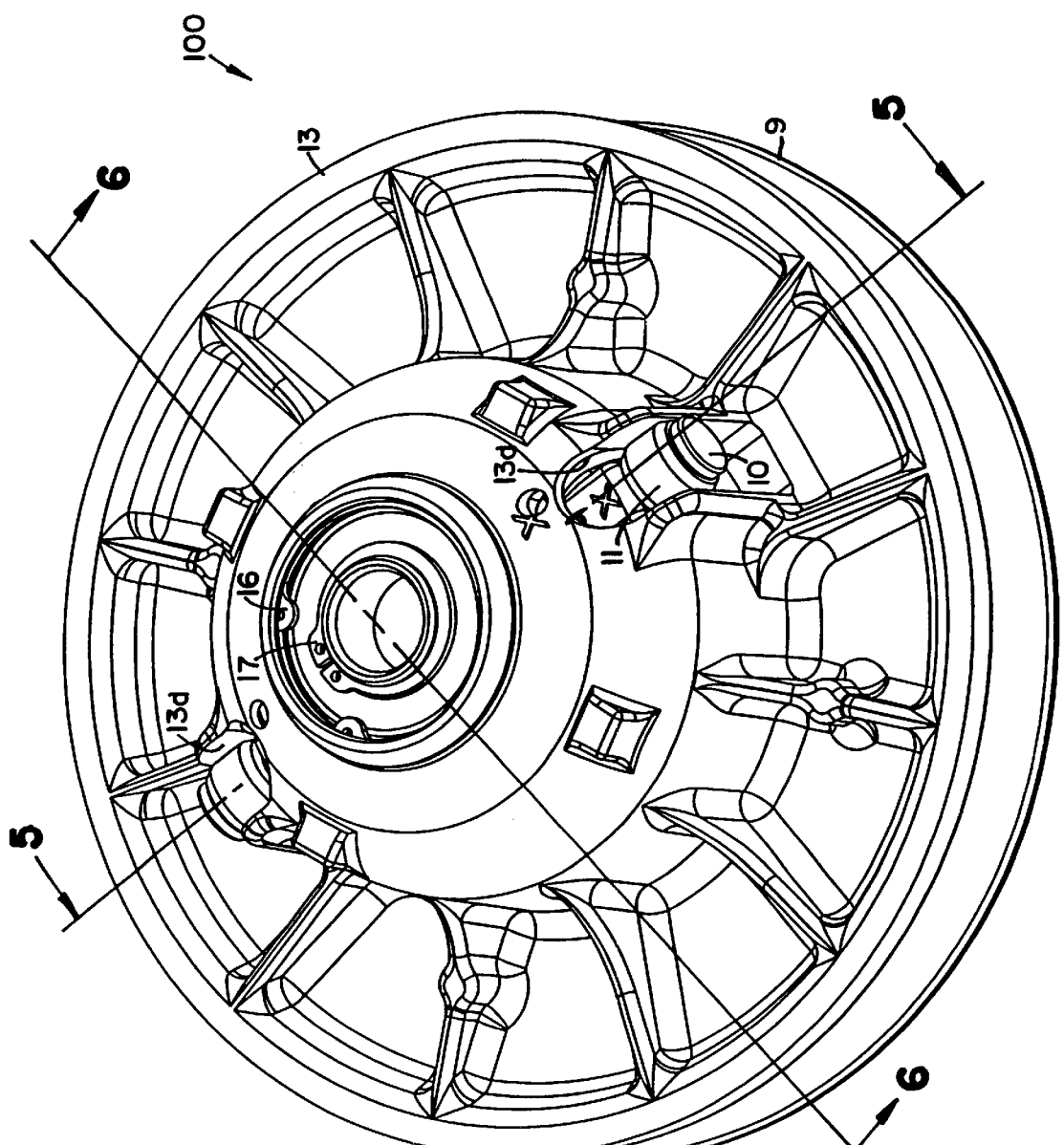
FIG. 4 is a top perspective view of the assembled driven clutch shown in FIG. 1.
Figure 5:
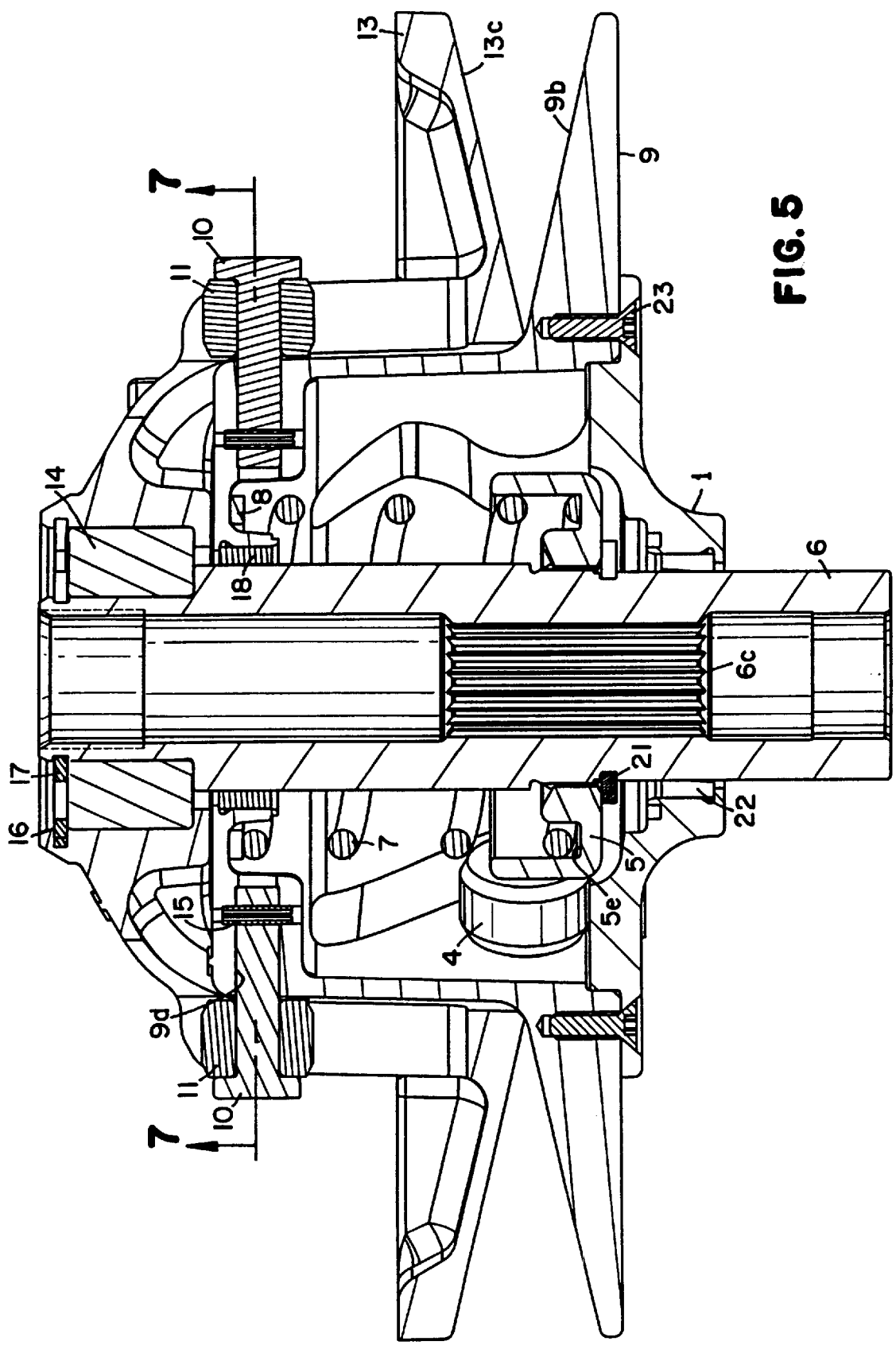
FIG. 5 is a cross-sectional view of the driven clutch shown in FIG. 4, taken generally along the lines 5—5.

A second, or moveable sheave 9, includes a generally cylindrical housing 9a and a conical-faced sheave portion 9b. The sheave portion 9b and housing 9a are preferably formed as an integral one-piece unit. The sheave portion 9b is a conically-faced belt contacting sheave portion which is coaxially mounted on the post 6 through an opening 9c. The second sheave 9 is rotatable on the post 6 and also may move longitudinally along the post 6 as will be described more fully hereafter. A bearing (or bushing) 18 is positioned in opening 9c and allows for rotating and translating on post 6. The housing 9a is sized and configured to be positioned inside of the housing 13a. As is well known in the art, an endless V-shaped belt connects the drive element to the driven clutch between the two conical-faced sheave elements. Openings 9d are formed in the housing 9a and are spaced 180 degrees. The openings 9d are longitudinal bores into the housing to receive the shaft of the pin 10. The openings 9d are in alignment with the slots 13d. As shown in FIG. 5, a roller 11 is positioned in each opening 9d and rotatably mounted on a pin 10. The portion of the housing 9a that is on top of the opening 9d has an aperture 9e formed therein. A pin 15 is inserted in the aperture 9e and goes through the pin 10 and into the housing 9a on the other side of the pin 10. This secures the pin 10 in the housing 9a. Other suitable methods may of course be utilized to rotatably mount the rollers 11. The assembled roller 11 and pin 10 is seen in FIG. 2. In assembling the clutch 100, the second sheave 9 is placed inside of the first sheave 13, as shown in the cross section views. Then the pin 10 and rollers 11 are assembled. Access openings 13d are formed in the housing 13a to provide access for a tool to insert the pins 15 into the housing 9a.

As can be seen in FIG. 6, a circular flange 9f is formed as a portion of the housing 9a and a bushing or bearing 18 is positioned inside of the flange 9f. A washer 8 is positioned on the outside of the flange 9f, as shown in FIG. 5. A compression spring 7 is positioned around the post 6 and has one end bearing on the washer 8 and the other end bearing on a spider 5. The spider 5 is generally ring shaped and has a planar surface 5a. A circular side member 5b is operatively connected to the planar surface 5a. An inner side member 5c is operatively connected to the planar member 5a and a plurality of vertical splines 5d are formed therein. A circular depression 5e is formed between the side members 5b and 5c. The other end of the spring 7 is positioned in the circular depression 5e. The spring initially holds the sheave portions together and the cam, as will be described more fully hereafter, is utilized to overcome the spring force and separate the sheave portions, thereby changing the effective diameter of the driven element. Two posts 5f are operatively connected to the spider 5 and extend generally outward and are spaced 180 degrees from each other. A roller 4 is rotatably mounted on the post 5f and secured by a washer 19 and snap ring 20. The splines 5d are in alignment with the splines 6a and secure the spider 5 to the post 6. It is understood that other suitable methods of connecting the spider to the post may be used such as a press fit, welding, use of Loctite™ or use of a key.

A cam 1 has a base plate 1a in which four screw openings 1b are formed. Screws 23 secure the cam 1 to the moveable sheave 9, as can be seen in FIG. 5. The cam 1 has a circular opening 1c for coaxially mounting the cam on the post 6. A bearing or bushing 22 is mounted in the opening 1c for rotatably mounting the cam 1 and the second sheave 9 around the post 6. As shown in FIG. 5, the snap ring 21 is positioned around the post 6 and prevents movement of the spider 5 past the snap ring 21. The cam housing 1d has a cam track that has a first cam surface 1e for positive torque and a second cam track if for negative torque. As can be seen, the cam surface if has a back angle which allows for the belt to be squeezed when engine braking is needed.

The present invention ties the first sheave 13 to the second sheave 9 by a pin 10 and roller 11. It is understood that other suitable methods may be utilized to secure the roller 11 to the housing 9. Similarly, it is also understood that where a roller 11 is utilized, one skilled in the art would also recognize that a button or sliding block or other methods may be used to similarly connect the two sheaves 9 and 13. Another example of how the two sheaves 9 and 13 could be tied together is a keyway type of arrangement between the sheaves 9 and 13. On one of the sheaves, it would have an open track, as with sheave 13. The other sheave would have a boss extending from its side that would fit into the open track and thereby tie the two sheaves together. Preferably, the open slot or track would be on the moveable sheave and the boss on the inside of the housing of the stationary sheave. With the present invention, due to tying the two sheaves 9 and 13 together, the rotational movement between the two sheaves 9 and 13 is eliminated. This will minimize the smearing of the belt. By eliminating, or substantially reducing the relative motion between the sheaves 9 and 13, belt life is also increased and engine braking is also improved. To allow the continuously variable transmission to change ratio, a bearing 14 or bar roller (anything to keep the stationary sheave concentric to and perpendicular to the axis of the post 6) is used to allow rotational movement of the stationary sheave 13 about the post. This bearing is then fixed to the post 6. This can be done by a retainer ring or shoulders on the posts 6. This allows the stationary sheave 13 to rotate, but not translate along the post 6 and lets the moveable sheave 9 translate along the post 6 and rotate relative to the post 6. The present invention which ties the two sheaves 9 and 13 together and sends all of the torque of the secondary clutch through the cam. This makes the present design more torque sensitive. Being more torque sensitive also provides for more effective engine braking. This can be done by sending all of the torque of the machine through the cam giving more control over how the belt is squeezed. There is engine braking by having two angles on the cam 1. The first cam surface 1e is used when the engine is driving the vehicle. The other cam surface if is a reverse angle on the cam. When the vehicle is driving the engine during engine braking, the roller 4 goes to the other side of the cam and hits the reverse angle 1f. This provides the torque sensitivity required to squeeze the belt tight enough to couple the engine to the driving member and use the engine compression to decelerate the vehicle. With the present design, we can fine tune when the engine braking occurs by where we begin the reverse angle cut. By adjusting the cam profile to begin engine braking at 20 miles per hour if that is what the market wants or 40 miles per hour or whatever else is needed. By changing the cam profile, will also change the amount of engine braking.

As previously discussed, the present invention provides for the tying together of the two sheaves 9 and 13 so that there is no relative rotation between the sheaves. This is accomplished by the rollers 11 that fit inside of the slots 13d. Therefore, when the sheave 9 rotates, the sheave 13 similarly rotates. Both sheaves 9 and 13 are free to rotate around the post 6. Further, the sheave 9 is able to move up and down the post 6 axially. This is caused by rotation of the cam 1. As the cam 1 rotates, it moves longitudinally about the sliding member of the spider 15 that are in the cam track. Because the cam and the moveable sheave 9 are fastened together, this motion moves the moveable sheave 9 rotationally and longitudinally. This causes the sheave 9 to rotate as the two are tied together by screws 23. This spider 5, which is fixed with respect to the post 6 will move the moveable sheave 9 in and out as the spider moves along the cam surfaces of the cam 1.

The present invention provides for the tying of the two sheaves 9 and 13 so that there is no relative rotation between the sheaves. The invention has been described with respect to a specific clutch configuration. However, it is understood that this invention may be used with many other types of clutches, either more sophisticated or simpler in design. A simpler clutch could be built that would be built on to a cylindrical base member. The cylindrical base member could either be a post as previously described or it could be built directly on to a transmission shaft. The base member would have a cam track machined on to its outer diameter. The stationary sheave would be fixed to the base member so that it could rotate. The moveable sheave would have a pin in it that is positioned in the cam profile on the shaft. A compression spring is positioned between the moveable sheave and the shoulder on the snap ring of the shaft. Then a suitable connector, as previously described, or other similar connectors would be utilized to tie the moveable sheave together with the stationary sheave that would prevent the relative motion between the two sheaves.

The foregoing paragraph describes another method of connecting the post to the second sheave in addition to the description as shown in FIGS. 1 through 8 wherein a cam 1 and spider 15 arrangement is utilized. It is understood that other suitable methods could be utilized to make this first connection. The second connector utilized in the present invention is the connector previously described to tie the first and second sheaves together wherein the first and second sheaves rotate together to reduce belt smear.

Figure 9:
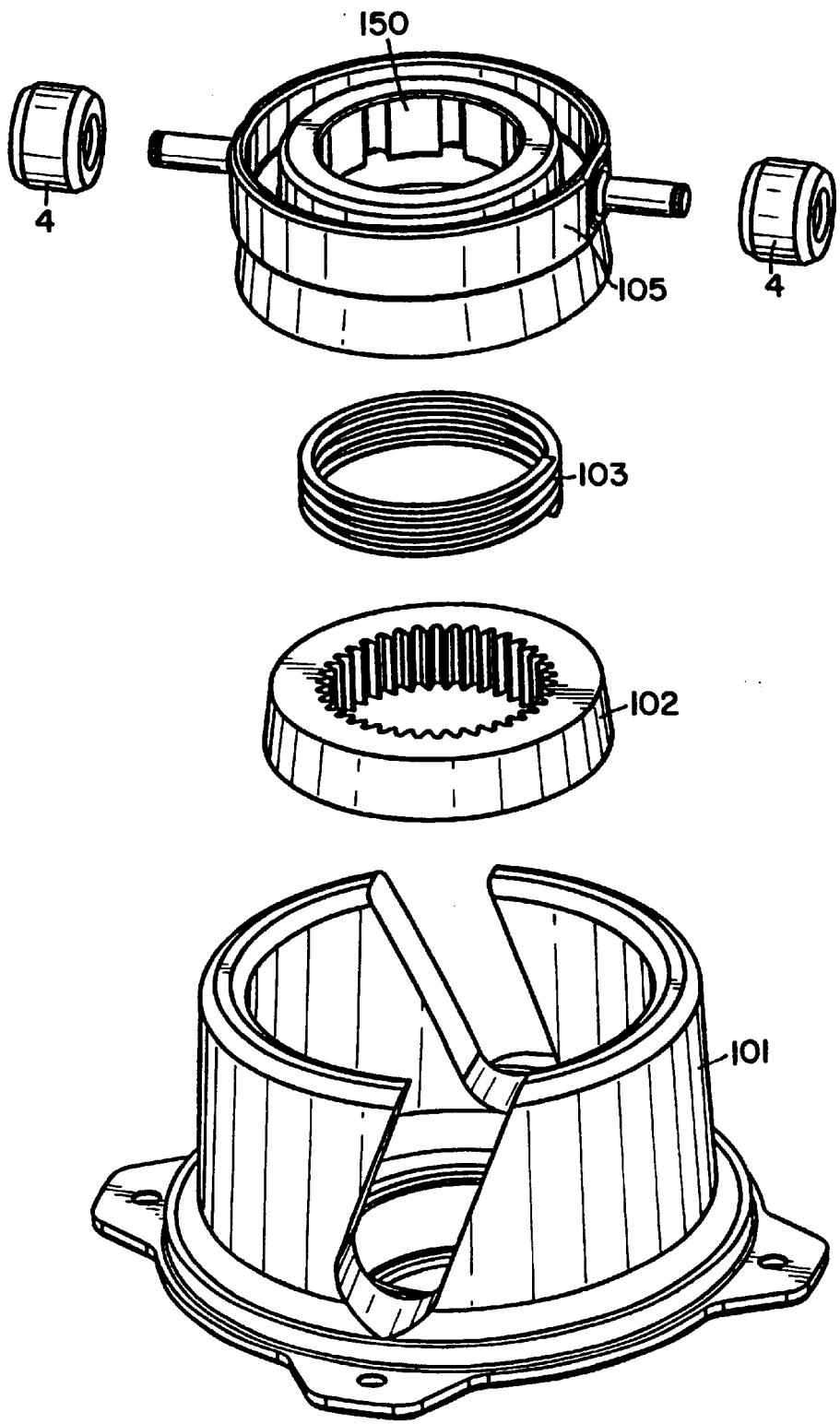
FIG. 9 is an exploded perspective of a second embodiment of the present invention.

A second embodiment of the present invention is shown in FIG. 9. Only those components which are different from that shown in the first embodiment are shown and it is only these different components that will be described, it being understood that the remainder of the components are similar to that shown in the first embodiment. The second embodiment is an engagement clutch mechanism that when engaged will deliver torque from the sheaves and belt through the spider and into the post. This mechanism can be a cone, plate or other clutch design. When this clutch is disengaged, no torque will be delivered through this mechanism. This part of the system uses the spider 105, disengagement spring 103, and a cone 102 that is locked to the post 6. The mechanism works in the following manner.

At idle, low ratio, the rollers 4 on the spider 105 contact the bottom of the cam track in the cam 101 which is bolted to the moveable sheave 9. When the rollers 4 bottom out in the cam 101, the force from the compression spring 7 is put into the moveable sheave and the cam. There is no force pushing the spider 105 into the cone 102 in this position. Because there is no force from the spring and sheaves, the disengagement spring 103 separates the cones and no torque is delivered.

Once the RPM of the engine starts going above idle, the CVT (continuously variable transmission) will begin to shift to a higher ratio. As this begins to shift, the moveable sheave 9 and cam 101 will move away from the stationary sheave 13. The rollers 4 will then move off the bottom of the cam 101 and begin to move up the cam track. As soon as the rollers begin moving up the cam profile, the compression spring 7 will push on the spider 105 with a certain force. The disengagement spring 103 will be less than the compression spring force. Because of this force difference, the compression spring 7 overcomes the disengagement spring 103 and pushes the spider 105 into the engagement mechanism 102 and torque is delivered to the post 6. Another important function of the disengagement spring 103 is to keep the sheaves 9 and 13 squeezing the belt tight.

This configuration will allow the belt to remain tight and keep the secondary portion of the CVT to be spinning all the time. One problem with the existing technology is that when at idle the primary clutch is not squeezing the belt tight enough to delivery power or spin the belt. During CVT engagement, the engine RPM increases and the primary portion of the CVT squeezes the belt with enough force to accelerate the system and move the vehicle. Once there is belt face force from the primary clutch, the vehicle will move. Up to this point however, the belt will slip. This is detrimental to the life of the belt. Our system will allow the engagement clutch, which is designed to slip, to do the slipping during engagement and save on belt life.

There are other systems in the market today that attempt to do something similar to the foregoing. One of these items is that people will put a starter, centrifugal clutch locking into a drum, on the crankshaft of an engine. When the engine gets to a high enough speed, the starter clutch will engage the crankshaft to the primary clutch and drive the vehicle. In this system, the belt part of the system is responsible only for ratio change and will always keep tight and the starter clutch does the engagement and overload slipping. One area that we feel the present invention is an improvement is that it is between the secondary clutch and the transmission or transaxle. This gives the benefit of having the slip torque set high enough to maximize the power to the ground. The other systems being on the engine are before the ratio reduction of the CVT. If there is a 30 foot-pound motor and a 3:1 CVT reduction, you get 90 foot-pounds into the transmission. The present invention could set the slip limit at 80 foot-pounds. In the other systems, if the slip feature is set at 10 foot-pounds below the rated torque, the slip torque would be 20 foot-pounds, you only get 60 foot-pounds to the transmission.

This system can be run either as a dry system or as a wet system where it would run in an oiled environment. Either way this could be run as seen in FIG. 9 or it could be packaged inside a transmission or transaxle.

Another feature of the second embodiment is a one-way clutch 150 housed in the spider 105. This clutch 105 can be used in two ways.

The first way a one-way clutch could be used is to use it as the primary torque carrying member. It would engage when the operator is trying to put torque through the CVT. The torque goes through the cam 101 into the spider 105 and into the post 6. With the one-way, the torque goes through the cam into the spider, into the one way and into the post. When there is a back-driving situation, the final driving member overdrives the CVT system, the one-way clutch would disengage from the post 6 and would let the CVT rotate with the engine. This is a feature that would work very well in snowmobiles. One example of this is when a rider locks up the brake for an instant then goes to wide-open throttle immediately. As soon as the brake is released, the track accelerates the jackshaft and secondary clutch driving the secondary clutch into the wrong ratio. Because the secondary clutch is in the wrong ratio, there can be an engine bog until the CVT shifts back to the correct ratio and the engine will then run at the optimum RPM. The one-way clutch 150 would keep the back driving torque from driving the secondary clutch into the incorrect ratio. Therefore, throttle response and efficiency would be vastly improved.

One other benefit of a one-way clutch is a lower rate compression spring 7 could be used and you would still have the performance of a heavier spring. A heavy spring is currently needed to help with some of the problems mentioned in the above paragraph. With a one-way clutch, a lighter spring could be used resulting in a more efficient CVT.

Other designs that don't use a one-way clutch balance backshifting, up shifting, top end speed, and efficiency. To get good back shifting, the current designs need a very high force spring. Belt life will be shortened, fuel mileage is diminished, top end speed is lower and overall efficiency will drop. To get better top end speed, fuel mileage, belt life, and efficiency, you need to run with a spring with less force. When you do this, the CVT will not back shift as fast as it would with a spring with less force. With a one-way bearing in either a tied together or a non-tied together CVT we can run spring with lower overall force but still get good back shifting. In general, we want to minimize spring force required to get the vehicle moving. Any more spring force will lower the overall performance and efficiency of the machine except for back shifting which it will improve. To make the CVT work you need specific belt face forces. The higher the spring rate required to get the back shifting, the less torque sensing we can put through the cam.

Another use for a one-way clutch 150 is in engine braking. As mentioned with the cone 102 or plate clutch feature, the belt and secondary sheave will always be spinning. There are times such as going down a steep hill, when the engine will be at idle but engine braking is needed. The one-way clutch would engage when the engine is at idle, the cone or plate clutch is disengaged, and the post is trying to go faster than the spider (tires are going faster than the motor). When the one-way clutch engages, it would give engine braking to the tires during slow speed, engine at idle maneuvers.

The engine-braking concept would allow the user to use a standard primary clutch with a special secondary clutch. While at speed, the cone clutch mechanism will stay engaged and keep the belt tight thereby creating engine braking. During idle or when the CVT is in low gear and the cone clutch is disengaged, the one-way clutch will engage and keep the sheaves tight allowing engine braking.

FIGS. 10–15 show the one-way bearing (clutch) in more detail.

Figure 11:
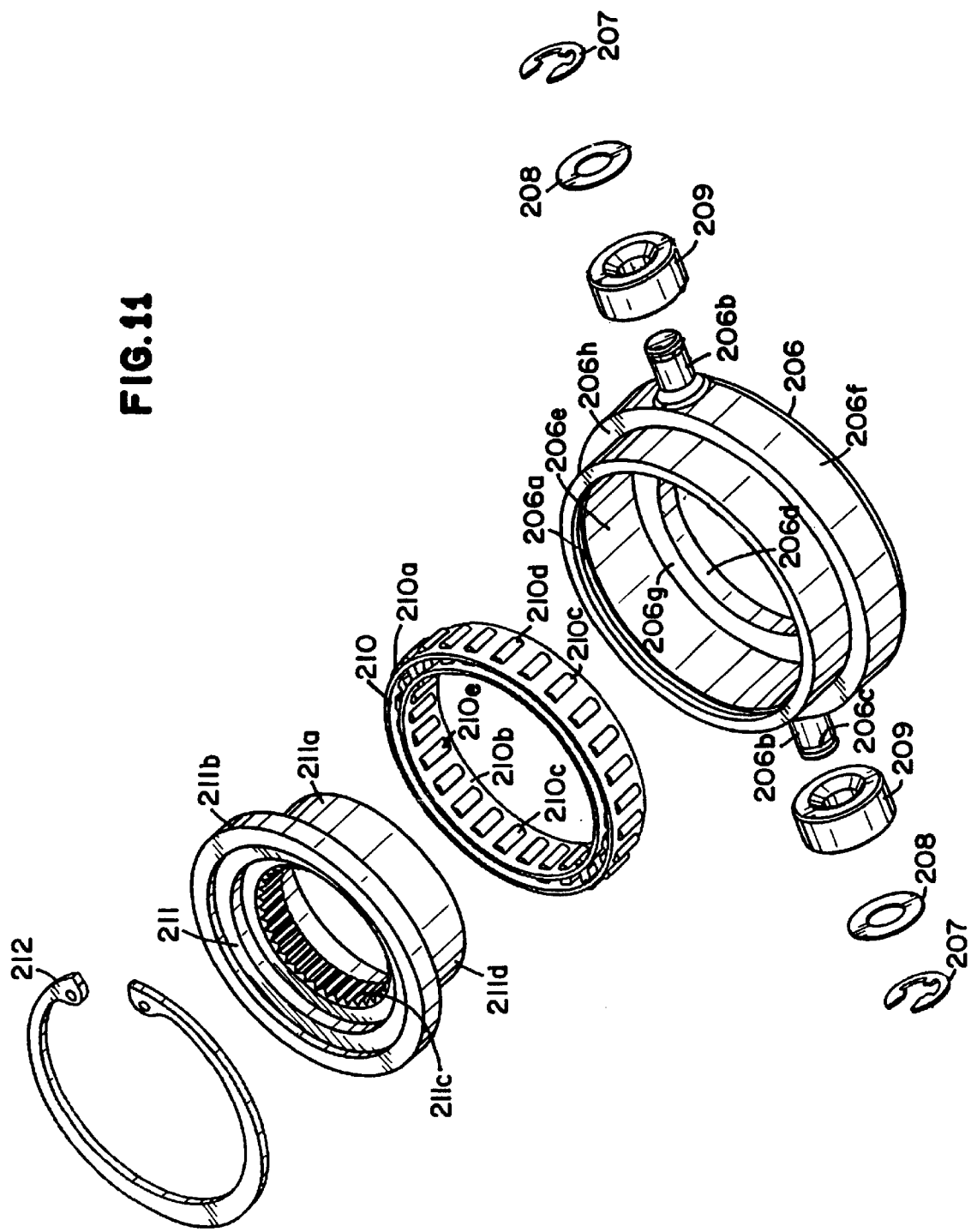
FIG. 11 is an enlarged exploded perspective showing the third embodiment of the invention within a spider assembly.

This clutch using the one-way bearing operates generally in the same manner as U.S. Pat. No. 6,120,399 and the clutch shown in FIGS. 1–9. The spider assembly, as shown best in FIG. 11, is a split spider with a one-way clutch 210 in it. When torque is being delivered from the engine to the drive train the one-way clutch 210 is engaged, the spider assembly is locked up and serves the same purpose as the spider 26, in U.S. Pat. No. 6,120,399 and spider 5 in FIG. 1 of this application.

When power is being delivered from the engine through the CVT and to the final member of the drive train, the one-way bearing 210 is locked up making the spider assembly a solid torque carrying member. Because the one-way bearing 210 is locked up, the spider assembly is fixed to the post 218 and will move the moveable sheave 216 in and out as the cam surfaces of the cam 204 move along the spider assembly.

When there is reverse torque being delivered from the tires or track to the CVT, the one-way bearing 210 will disengage and allow the secondary clutch to shift to a lower ratio with the primary doing the same.

The invention relates to any vehicle, which embodies a CVT drive system as in the case of snowmobiles, ATVs, and go-carts.

The following is one method of how a one-way bearing would work with a CVT drive system. The one-way bearing 210 as a torque carrying member of the drive train may be put in many areas of the drive train between the CVT and final drive member to get some of the same benefits as mentioned above. Further specific examples include between the secondary clutch post and the transmission input shaft or snowmobile jackshaft; or between a gear or sprocket and a transmission shaft. In any of these locations, the one-way clutch mechanism would be engaged during providing power from the engine to the final drive member. It would be disengaged anytime the final drive member tried to back drive the rest of the drive train. When it became disengaged, it would prevent the reverse torque from keeping the secondary clutch in to high of a ratio or driving the secondary clutch into an even higher ratio. By disengaging the secondary clutch from the rest of the downstream driveline during reverse torque events, the secondary clutch could follow the primary clutch into a lower ratio and give better back shifting performance.

Figure 10:
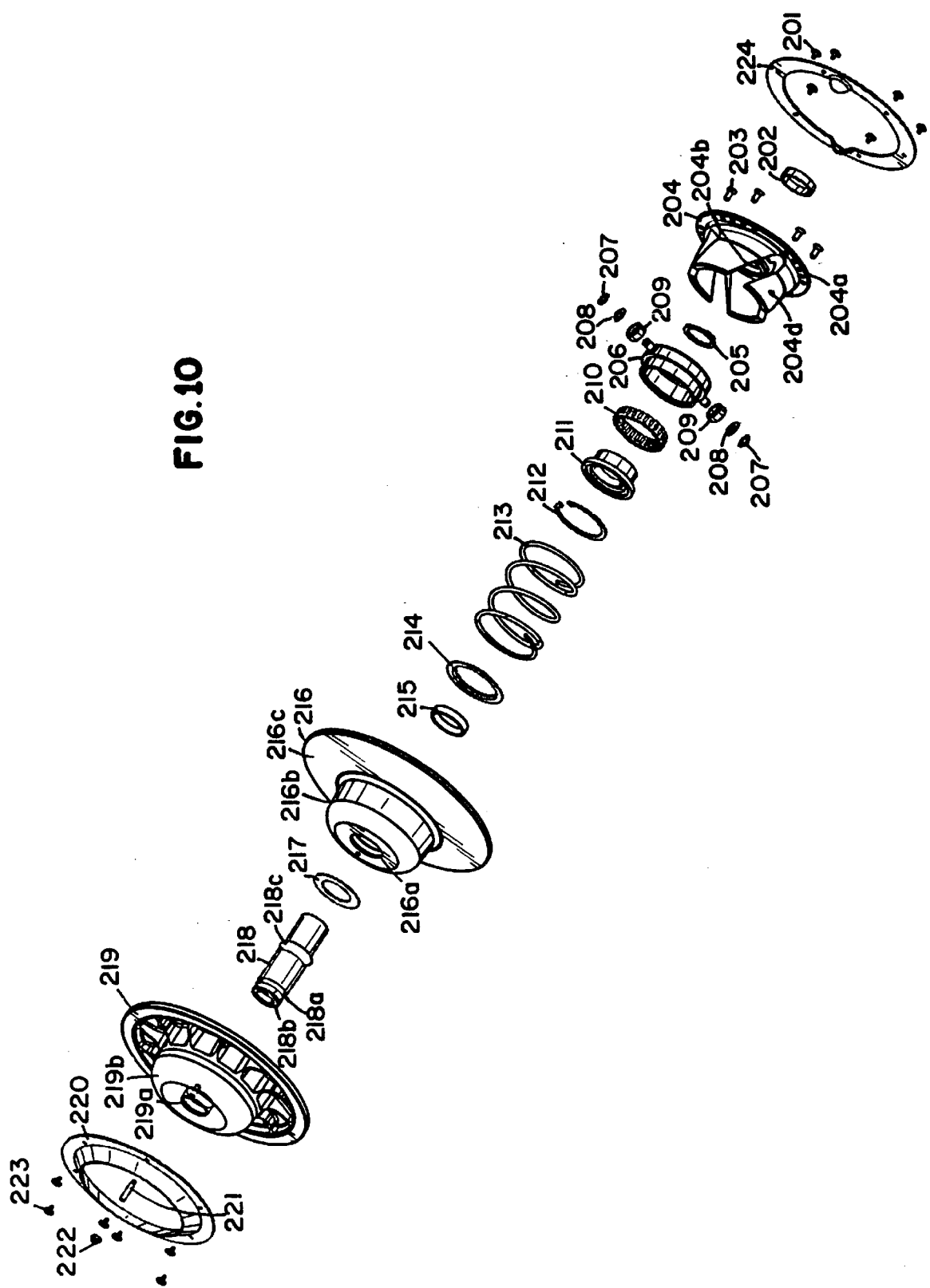
FIG. 10 is an exploded view of a third embodiment of the present invention.
Figure 12:
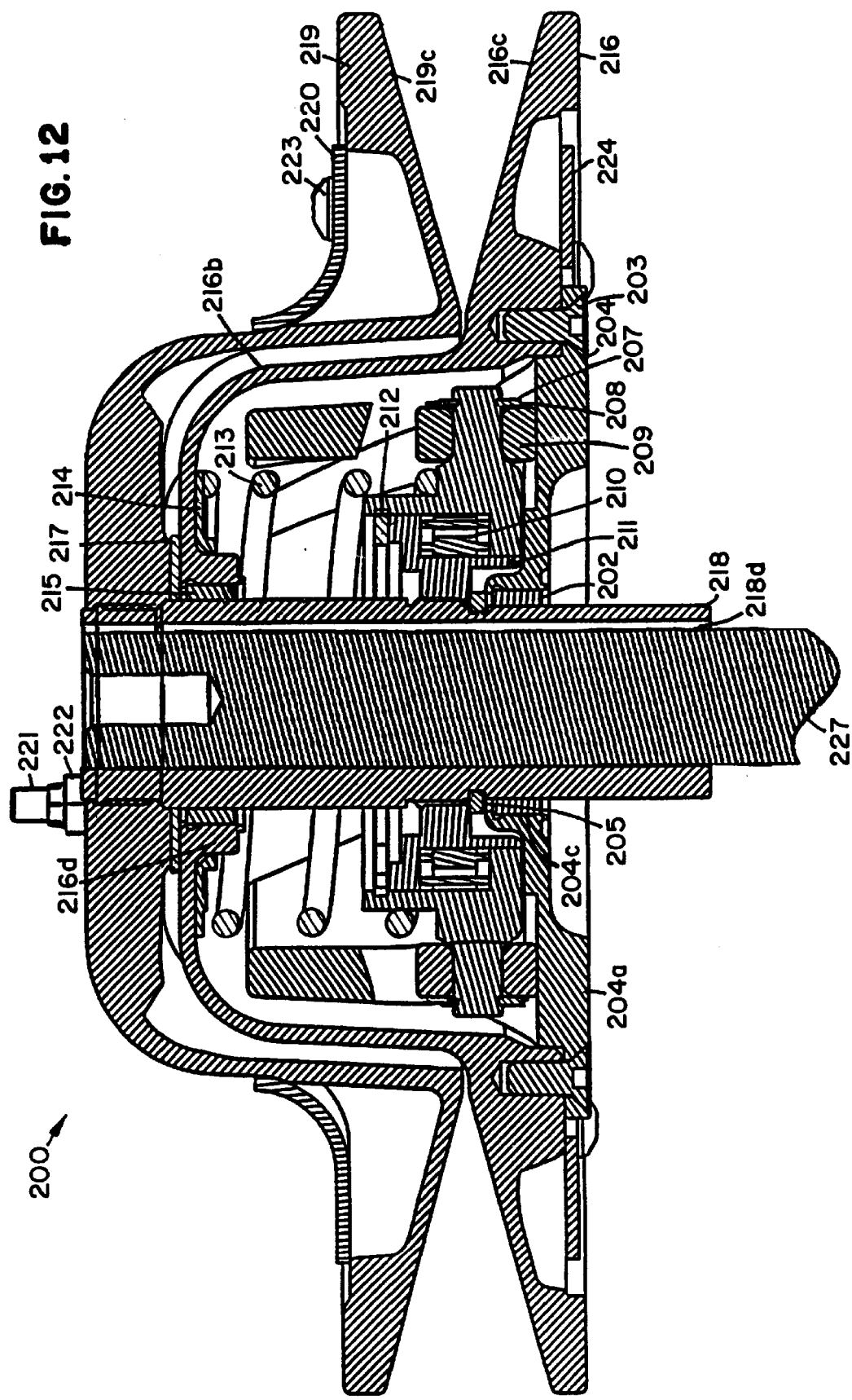
FIG. 12 is a cross-sectional view of the driver clutch of the third embodiment in low-ratio position.
Figure 13:
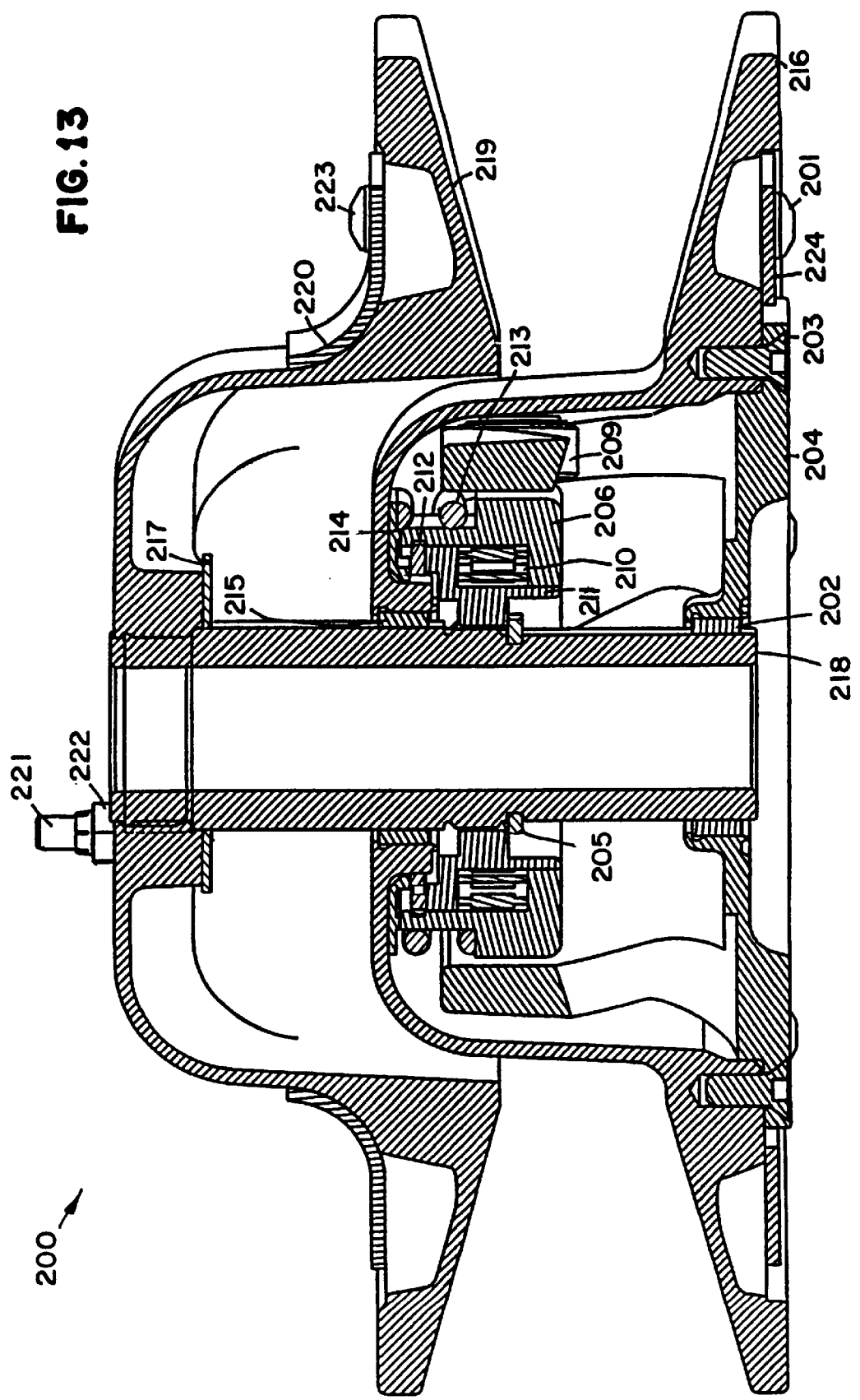
FIG. 13 is a cross-sectional view of the driver clutch of the third embodiment in high-ratio position.

Referring to FIGS. 10–13, there is generally designated at 200 a driven clutch. The driven clutch will be described generally, as with the exception of the split spider and one-way bearing, it is very similar to that described in FIGS. 1–9. The one-way bearing of the present invention may be used with either a tied together clutch as shown or a more standard non-tied together clutch which has relative motion between the sheaves. A generally cylindrical post 218 has a plurality of vertical splines 218c formed at its top and the post 218 has a thread at its top end. As seen in FIG. 12, an interior keyway 218d is formed over the longitudinal bore. This allows for a connection to a rotatable shaft 227, such as a transmission shaft or snowmobile jackshaft or other suitable connections, well known in the art. In FIG. 10, a first sheave 219 has a generally cylindrical housing 219b having a threaded opening 219a machined therein. The sheave 219 also includes a first conical-faced belt contacting coaxially mounted sheave portion 219c which is preferably formed with the housing 219b to form a unitary, one-piece first sheave 219. The first sheave 219 is connected to the post 218 via threads 219a and 218b.

A second, or moveable sheave 216 includes a generally cylindrical housing 216b and a conical-faced sheave portion 216c. The sheave portion 216c and housing 216b are preferably formed as an integral one-piece unit. The sheave portion 216c is a conically faced belt contacting sheave portion, which is coaxially mounted on the post 218 through an opening 216a. The second sheave 216 is rotatable on the post 218 and also may move longitudinally along the post 218. A bearing or bushing 215 is positioned in opening 216a and allows for rotating and translating on post 218. The housing 216b is sized and configured to be positioned inside of the housing 219b. As is well known in the art, an endless V-shaped belt connects the drive element to the driven clutch between the two conical-faced sheave elements.

As can be seen in FIG. 12, a circular flange 216d is formed as a portion of the housing 216b and a bushing or bearing 215 is positioned inside of the flange 216d. A washer 214 is positioned on the outside of the flange 216d as shown in FIG. 12. A compression spring 213 is positioned around the post 218 and has one end bearing on the washer 214 and the other end bearing on a spider 206.

The spider 206 is generally ring shaped and has a planar surface 206g. A circular side member 206f is operatively connected to the planar surface 206g. An inner side member 206e is operatively connected to the planar member 206g. Inner member 206e has a groove 206a cut in it for retaining ring 212. One end of the spring 213 is positioned against face 206h. The spring 213 initially holds the sheave portions 216, 219 together and the cam 204, as will be described more fully hereafter, is utilized in conjunction with the spring force as well as the primary clutch to separate the sheave portions 216, 219, thereby changing the effective diameter that the drive belt runs at on the driven element.

Two posts 206b are operatively connected to the spider 206 and extend generally outward and are spaced 180 degrees from each other. A roller 209 which is a sliding member, is rotatably mounted on each of the post 206b and secured by a washer 208 and snap ring 207 in groove 206c. The one-way bearing 210, slides into the spider housing and is positioned proximate inner member 206e. The one-way bearing 210 is described as a one-way bearing, however, it is understood that a one-way clutch would also be an appropriate description. The one-way bearing or clutch 210 may be any suitable type of one-way clutch such as a sprag clutch provided by Borg-Warner, it being understood many other companies make this type of a one-way bearing. As shown in FIG. 11, the bearing 210 has an outer cage 210a and an inner cage 210b. A plurality of sprags 210c extend through openings in the outer cage 210a and inner cage 210b. The sprags 210c have a generally dumbbell-type shape and have an outer member 210d and an inner member 210e. As will be described more fully hereafter, the outer member 210d contacts the inner member 206e and the inner member 210e contacts a spider collar 211. The spider collar 211 has a top circular portion 211b operatively connected to a cylindrical member 211a, and both are preferably formed as a single, unitary piece. The cylindrical member 211a has an outer surface 211d. It is the outer surface 211d that is in contact with the inner member 210e of the sprag 210c. A plurality of vertical splines 211c are formed on the interior opening in the collar 211. These splines 211c cooperate with the splines 218c to secure the collar 211 to the post 218 so that there is no rotational movement between the collar 211 and post 218. The spider collar 211 is slid into the one-way bearing 210 and spider 206. Retaining ring 212 is put into the groove 206a in the spider. This spider assembly is ten fully retained by the part stackup going one direction and the retaining ring 212 holding it in the other direction. This assembly may also have a seal (not shown) such as an o-ring, between surfaces 211b and 206e, and 211a and 206d. The cavity in which the one-way bearing runs in has oil or grease (not shown) in it for lubrication. The collar 211 is fixed to the post 218 longitudinally by the shoulder 218a on the post 218 and the retaining ring 205. It is understood tat other suitable methods of connecting the spider to the post may be used such as a press fit, welding, use of Loctite or use of a key.

The one-way clutch is positioned to transmit torque when the engine is delivering power through the CVT to the tires or frock. When power is being delivered from the engine through the CVT and to the final member of the drive train, the one-way clutch 210 is locked up making the spider assembly a solid torque carrying member. Because the one-way clutch 210 is locked up, the spider assembly is fixed to the post 218 and will move the moveable sheave 216 in and out as the cam surfaces of the cam 204 move along the spider. When there is reverse torque being delivered from the tires or track to the CVT, the one-way clutch 210 will disengage and allow the secondary clutch to follow the primary clutch to a lower ratio.

A cam 204 has a base plate 204a in which four screw openings are formed. Screws 203 secure the cam 204 to the moveable sheave 216 as can be seen in FIG. 12. The cam 204 has a circular opening 204c for coaxially mounting the cam on the post 218. A bearing or bushing 202 is mounted in the opening 204c for rotatably mounting the cam 204 and thereby the second sheave 216 around the post 218. As shown in FIG. 12 the snap ring 205 is positioned around the post 218 and prevents movement of the spider collar 211 past the snap ring 205. The corn housing 204d has a cam track surface 204b. As the cam 204 rotates, it moves about and longitudinally on the roller 209, which is a sliding member, of the spider 206 in the cam track 204b. Because the cam and the moveable sheave 216 are fastened together by screws 203, this motion moves the moveable sheave 216 rotationally and longitudinally. When power is being delivered from the engine through the CVT and to the final member of the drive train the one-way clutch 210 is locked up making the spider assembly a solid torque carrying member. Because the one-way clutch 210 is locked up, the spider assembly is fixed to the post 218 and will move the moveable sheave 216 in and out as the spider moves along the cam surfaces 204b of the cam 204.

Also shown in FIGS. 10 through 14 are windage plates 220, 224. Windage plate 224 is secured by screws 201 and windage plate 220 is secured by screws 223. As is well known in the art, a screw 221 threaded into the stationary sheave 219 and secured by a jam nut 222 and is used for setting belt spacing between the sheaves 219, 216.

Figure 14:
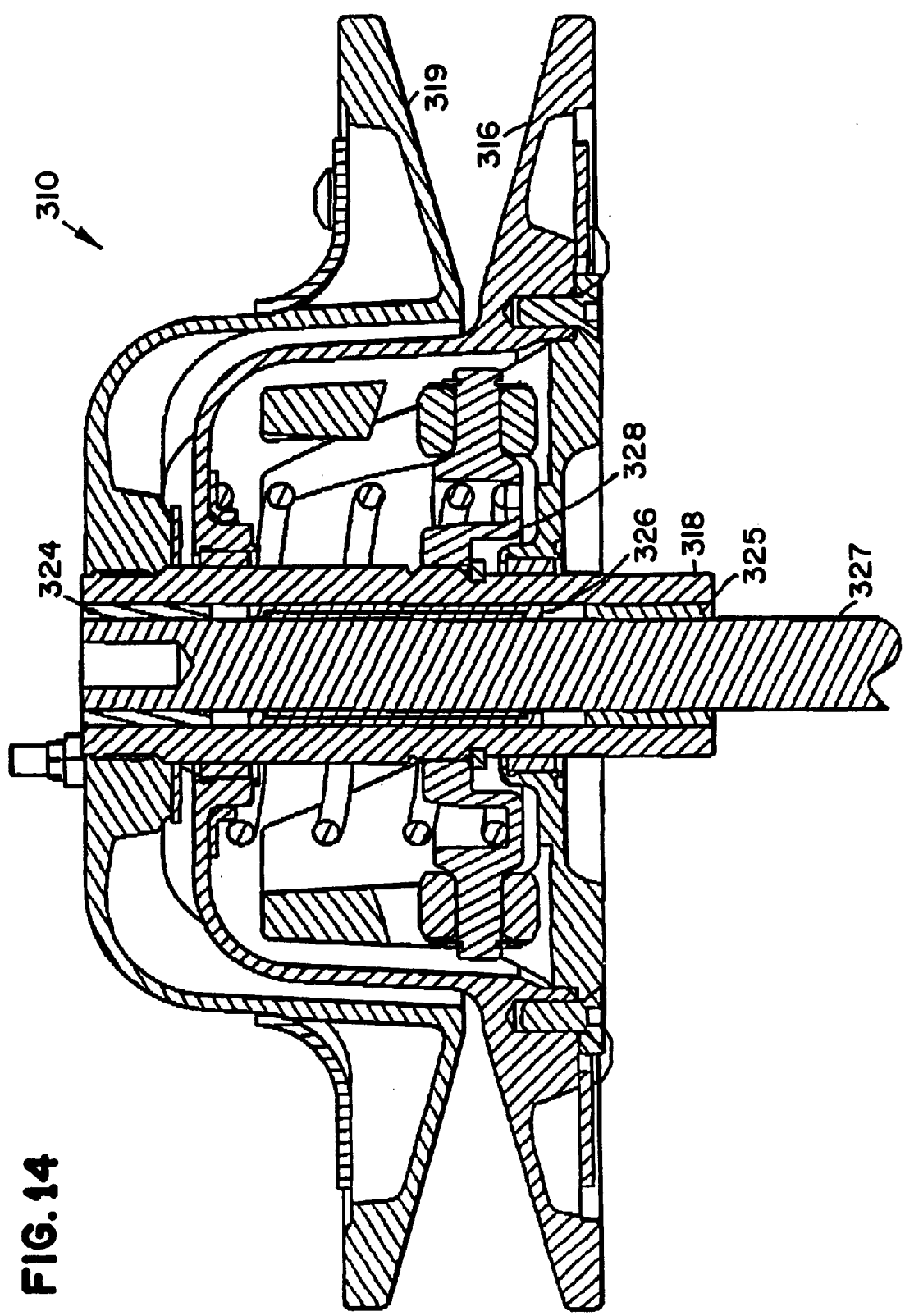
FIG. 14 is a cross-sectional view of a fourth embodiment.

Another embodiment of the present invention is shown in FIG. 14. FIG. 14 shows a clutch 310. The clutch 310 will not be described in detail as a substantial portion of the components are identical to that previously described. However, the differences will be detailed for a complete understanding of the clutch 310 and the manner in which the one-way bearing 326 is positioned. The clutch 310 has a moveable sheave 316 and a stationary sheave 319. Spider 328 is a standard clutch spider, such as that shown in FIGS. 1–9. This spider 328 is attached via splines or a keyway to the clutch post 318. In the clutches previously described, the secondary clutch is fixed to the transmission input shaft or jackshaft 227 via splines or a keyway and is held coaxially to the transmission input shaft 227 by close tolerances in pilot diameters between the post and input shaft. However, in the clutch 310, the clutch post 318 is held coaxially and is allowed to rotate about the transmission input shaft or snowmobile jackshaft 327 by bushings 324, 325. The secondary clutch 310 transmits torque to the transmission input shaft 327 via a one-way bearing 326. The one-way bearing 326 is of a construction similar to that of one-way bearing 210. The one-way bearing 326 has an outer member that is in contact with the inner surface of the post 318 and the one-way bearing 326 has an inner member in contact with the outer surface of the rotatable shaft 327. When the engine is delivering power through the CVT to the final rotating member in the drive train, the one-way bearing 326 will be engaged and locked up. The one-way bearing 326 will disengage when an operator lets off the throttle and the final rotating member, such as a snowmobile track or a tire, tries to overrun the engine. This reverse torque will cause the one-way bearing 326 to decouple the CVT from the rest of the drive train and will prevent the reverse torque from keeping or driving the secondary into too high of a ratio causing poor backshifting. This embodiment is another method of decoupling the CVT from the rest of the drive train in reverse torque conditions. This will allow the CVT to perform better because it will be able to follow the primary clutch into a lower ratio and backshifting performance will improve.

As can be seen, FIGS. 10 through 13 provide this decoupling inside of a split spider. The decoupling in FIG. 14 is between the post and the jackshaft or transmission input shaft. It is understood that there may be other places where the CVT could be decoupled further down in the drive train and still provide the advantages of decoupling the CVT from the drive train under reverse torque conditions.

Figure 15:
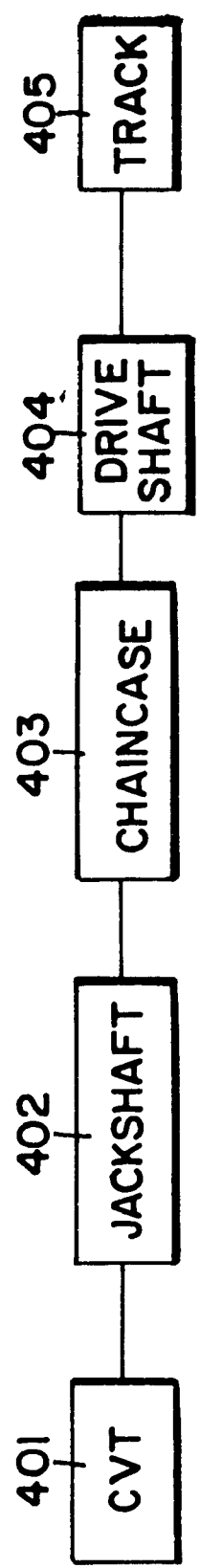
FIG. 15 is a schematic representation of a drive train of a snowmobile.

FIG. 15 is a schematic representation of a snowmobile. The CVT 401 is operatively connected to a jackshaft 402 which in turn is operatively connected to a chain case 403. The chain case 403 is operatively connected to the drive shaft 404 which is in turn operatively connected to the track 405. The decoupling of the clutch shown in FIGS. 10 through 13 occurs in the CVT 401. The decoupling in the clutch shown in FIG. 14 occurs between the CVT 401 and the jackshaft 402. It is also appreciated that the decoupling by a one-way bearing may be anywhere further down the drive train anywhere between the jackshaft 402 and the track 405.

Figure 16:
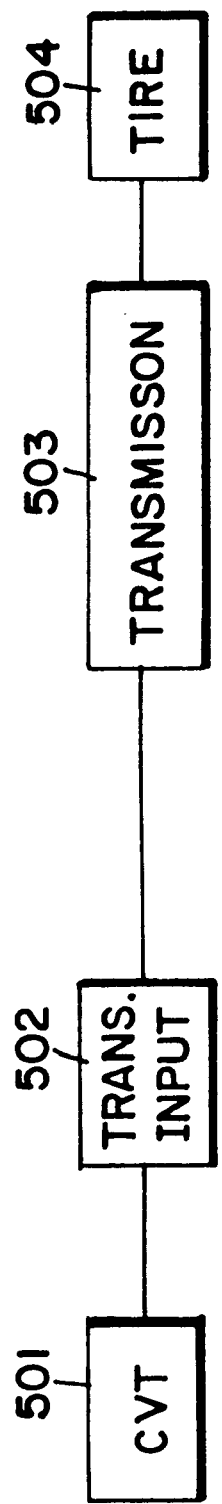
FIG. 16 is a schematic representation of a drive train of a wheeled vehicle.

Similarly, FIG. 16 is a schematic representation of a CVT in use with a land vehicle such as a go-cart or ATV. The CVT 501 is operatively connected to the transmission input shaft 502, which is in turn operatively connected to the transmission 503. The transmission 503 is operatively connected to the tire 504. The decoupling of the clutch shown in FIGS. 10 through 13 occurs in the CVT 501. The decoupling in the clutch shown in FIG. 14 occurs between the CVT 501 and the transmission input shaft 502. It is also appreciated that the decoupling by the one-way bearing may be further down the drive train anywhere between the transmission input 502 and the tire 504.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An assembly comprising:
   a) a continuously variable transmission;
   b) a final rotating member of a drive train, the final rotating member operatively connected to the continuously variable transmission;
   c) a torque carrying one-way bearing operatively connected between the continuously variable transmission and the final rotating member, wherein the one-way bearing couples the continuously variable transmission and the final rotating member during delivery of torque and decouples the continuously variable transmission and the final rotating member during delivery of reverse torque.

2. The assembly of claim 1, further comprising:
   a) the continuously variable transmission having a post having an inner bore having an inner surface;
   b) a rotatable shaft having an outer surface, the rotatable shaft positioned in the inner bore; and
   c) the one-way bearing positioned around the rotatable shaft, the one-way bearing having an outer member in contact with the inner surface of the post and an outer member in contact with the outer surface of the rotatable shaft.

3. The assembly of claim 1, further comprising:
   a) the continuously variable transmission having a spider comprising:
      i) a spider housing having a central bore, the central bore having an inner surface; and
      ii) a spider collar having a cylindrical member, the cylindrical member having an outer surface; the cylindrical member sized and configured to be positioned in the central bore; and
   b) the one-way bearing positioned in central bore, the one-way bearing having an outer member in contact with the inner surface and an inner member in contact with the outer surface.

* * * * *

UNITED STATES PATENT AND TRADEMARK OFFICE
CERTIFICATE OF CORRECTION

PATENT NO. : 6,569,043 B2
DATED : May 27, 2003
INVENTOR(S) : Bruce H. Younggren et al.

It is certified that error appears in the above-identified patent and that said Letters Patent is hereby corrected as shown below:

<u>Title page,</u>
Item [73], Assignee, delete "Team" and insert therefor -- TEAM --

<u>Column 7,</u>
Lines 53 and 54, delete "if" and insert therefore -- 1$f$ --

<u>Column 8,</u>
Line 28, delete "if" and insert therefore -- 1$f$ --

<u>Column 13,</u>
Line 39, delete "tat" and insert therefore -- that --
Line 44, delete "frock" and insert therefore -- track --
Line 64, delete "corn" and insert therefore -- cam --

Signed and Sealed this

Fourteenth Day of October, 2003

JAMES E. ROGAN
*Director of the United States Patent and Trademark Office*